(No Model.) 2 Sheets—Sheet 2.

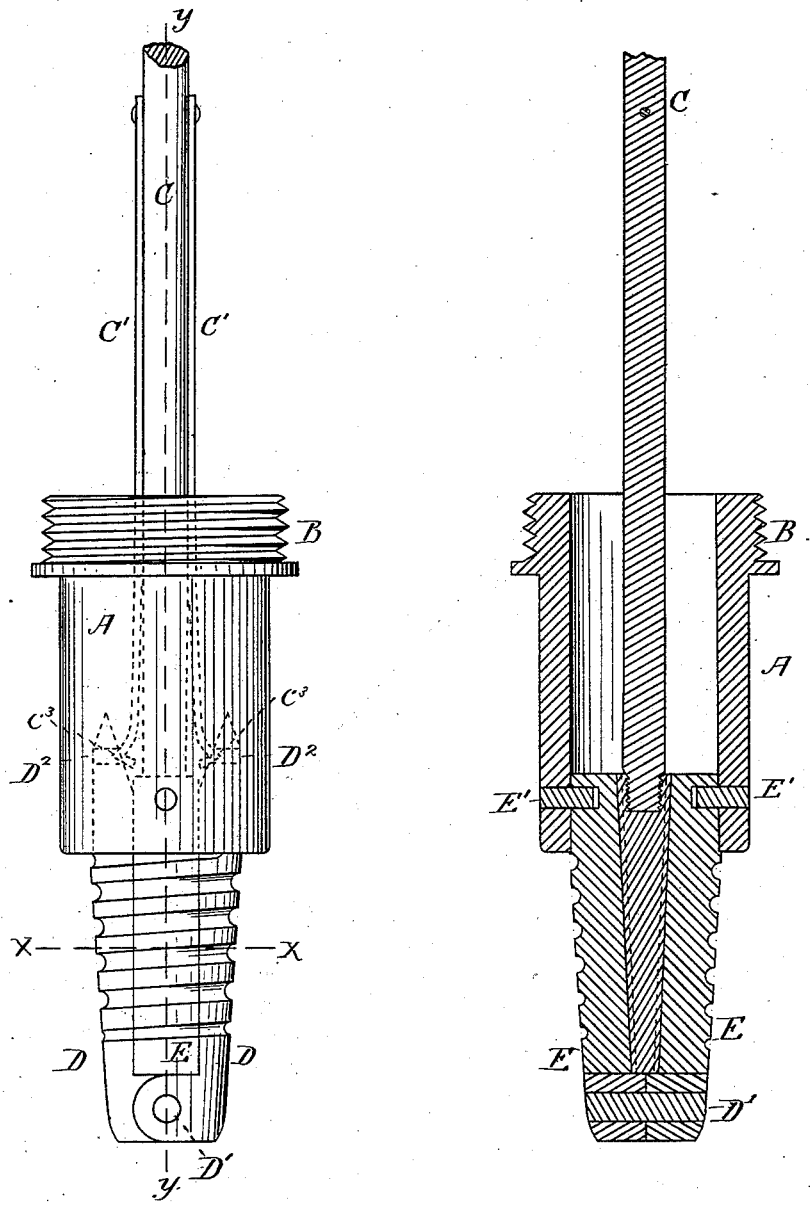

S. OAKMAN.
MOLD FOR MAKING GLASS INSULATORS.

No. 304,748. Patented Sept. 9, 1884.

WITNESSES
Frank G. Parker
Helen M. Feegan

INVENTOR
Samuel Oakman

UNITED STATES PATENT OFFICE.

SAMUEL OAKMAN, OF MELROSE, MASSACHUSETTS.

MOLD FOR MAKING GLASS INSULATORS.

SPECIFICATION forming part of Letters Patent No. 304,748, dated September 9, 1884.

Application filed May 31, 1884. (No model.)

*To all whom it may concern:*

Be it known that I, SAMUEL OAKMAN, of Melrose, in the county of Middlesex and State of Massachusetts, have invented certain new and useful Improvements in Molds for Making Glass Insulators, of which the following is a specification.

My invention relates to the method of withdrawing the "screw-points" of an insulator-mold, the object being to so construct the point that it will make a full screw and be collapsible, so that the point may be withdrawn without turning it. I attain these objects by the mechanism illustrated in the accompanying drawings, in which—

Figure 3:
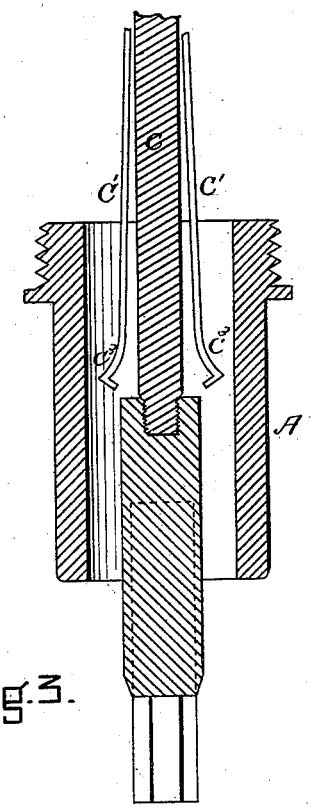
Figure 4:
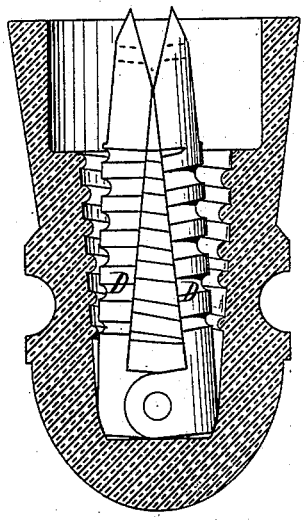
Figure 5:
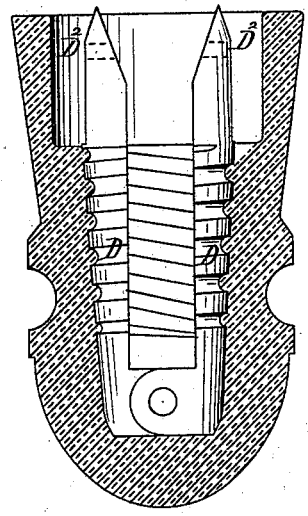

Figure 1 is an elevation of my invention. Fig. 2 is a vertical section of the same, taken on line $y\ y$ of Fig. 1. Fig. 3 shows an insulator with a part of the core in place, the central wedge and the side segments being withdrawn, as shown above. Fig. 4 is a section of an insulator with the hinged part of the core collapsed ready for withdrawal. Fig. 5 is a cross-section taken on line $x\ x$ of Fig. 1.

In the drawings, A, Figs. 1, 2, and 3, represents the body of the point, B being a screw which serves to connect the point to the press. Attached to the lower part of this body A are a pair of hinged screw-pieces, D D, Figs. 1, 3, 4, and 5, hinged at D', as shown at Figs. 1, 2, 3, and 4. These pieces are connected to the rod C at their upper ends by springs C' C', Figs. 1 and 3. These hinged screw-pieces D D are supplemented by side pieces, E E, Figs. 2 and 5. In this connection it may be well to state that the section shown in Fig. 2 is made at right angles to the plane of view of Fig. 1.

F is a wedge-shaped piece connected to the rod C, by which said rod may be withdrawn sufficiently to allow the pieces E E to collapse so much that the lands of the thread of the point may clear the threads formed in the insulator. When this takes place, a continued upward motion of the rod C will withdraw the side pieces, E E, of Fig. 2 entirely from the insulator, as shown in Fig. 3, leaving the hinged screw parts in the insulator, as shown in said Fig. 3. Then the operator will collapse the parts D D, as shown in Fig. 4, and withdraw them, leaving the insulator complete.

C' C', Figs. 1 and 3, are spring-catches, which have V-shaped terminations $C^3\ C^3$ so arranged as to readily engage with the holes $D^2\ D^2$, Figs. 1 and 3, in the hinged screw-pieces D D. This device serves to hold the hinged pieces D D in position, as shown in Fig. 1, and thus keep the screw-point intact when it is out of the insulator, but admits of the center being withdrawn without withdrawing the hinged pieces D D, as the resistance of the glass will hold these hinged pieces sufficiently to cause the V-shaped part $C^3\ C^3$ of the spring C' C' to slip out of contact. The side screw-pieces, E E, are attached to the lower part of the body A by means of pins E' E', Fig. 2. These pins are rigidly attached to the body A, but loosely fit the recesses in the parts E E.

I claim—

1. In an insulator-mold, the combination of the hinged screw-pieces D D, and side pieces, E E, with the wedge-piece F, all operating together substantially as described, and for the purpose set forth.

2. In an insulator-mold, the combination of the hinged screw-pieces D D with the spring-catches $C^3\ C^3$ and the rod C, all operating together substantially as described, and for the purpose set forth.

SAMUEL OAKMAN.

Witnesses:
  FRANK G. PARKER,
  HELEN M. FEEGAN.